(12) United States Patent
Hull (10) Patent No.: US 9,855,661 B2
(45) Date of Patent: Jan. 2, 2018

(54) COLLISION PREVENTION IN ROBOTIC MANUFACTURING ENVIRONMENTS

(71) Applicant: The Boeing Company, Chicago, IL (US)

(72) Inventor: Jerald A. Hull, Charleston, SC (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 15/084,107

(22) Filed: Mar. 29, 2016

(65) Prior Publication Data

US 2017/0282369 A1 Oct. 5, 2017

(51) Int. Cl.
*G05B 19/4061* (2006.01)
*B25J 9/16* (2006.01)

(52) U.S. Cl.
CPC .......... *B25J 9/1676* (2013.01); *B25J 9/1697* (2013.01); *G05B 19/4061* (2013.01)

(58) Field of Classification Search
CPC ...... B25J 9/1697; B25J 19/023; B25J 19/021; B25J 9/1676; G05B 19/4061; G01B 11/03; G01B 2210/306; G01B 9/02061
See application file for complete search history.

(56) References Cited

U.S. PATENT DOCUMENTS

| | | | |
|---|---|---|---|
| 3,986,007 A * | 10/1976 | Ruoff, Jr. ................. | B25J 15/08 250/548 |
| 8,970,823 B2 | 3/2015 | Heidemann et al. | |
| 9,041,914 B2 | 5/2015 | Tohme et al. | |
| 9,115,986 B2 | 8/2015 | Heidemann et al. | |
| 9,146,315 B2 | 9/2015 | Bosse et al. | |
| 2009/0326711 A1* | 12/2009 | Chang ................... | B25J 9/1666 700/248 |
| 2014/0081459 A1* | 3/2014 | Dubois ................. | B25J 9/1697 700/259 |

OTHER PUBLICATIONS

Rüther; "The Narcissistic Robot: Robot Calibration Using a Mirror"; 11th Int. Conf. Control, Automation, Robotics and Vision; Singapore, Dec. 7-10, 2010; pp. 169-174.*
Rüther; "The Narcissistic Robot: Robot Calibration Using a Mirror"; 11th Int. Conf. Control, Automation, Robotics and Vision; Singapore, Dec. 7-10, 2010; pp. 169-174 (Year: 2010).*
3D Scanner, https://en.wikipedia.org/wiki/3D_scanner#Triangulation, Jan. 25, 2016, pp. 1-15.

* cited by examiner

*Primary Examiner* — Stephen Holwerda
(74) *Attorney, Agent, or Firm* — Duft Bornsen & Fettig LLP (57) ABSTRACT

Systems and methods are provided for collision prevention One embodiment is an apparatus that includes a robot. The robot includes an end effector that operates within a manufacturing cell, and actuators defining a kinematic chain that reorients the end effector within the manufacturing cell. The robot also includes an imaging system mounted with the end effector, and a controller. The controller is able to direct the actuators to orient the imaging system towards the mirror, to acquire a point cloud of 3D positions by operating the imaging system to scan an image in the mirror, and to revise the 3D positions in the point cloud by folding the 3D positions about a surface defined by the mirror. The robot is also able to determine a volume occupied by the robot within the manufacturing cell, and to direct the robot to operate based on the volume to prevent collisions.

20 Claims, 8 Drawing Sheets

COLLISION PREVENTION IN ROBOTIC MANUFACTURING ENVIRONMENTS

FIELD

The disclosure relates to the field of robotics, and in particular, to collision prevention in robotic manufacturing environments.

BACKGROUND

Robots are utilized in a variety of manufacturing environments. For example, a robot may be placed within a cell (i.e., a predefined volume of space) on an assembly line. The robot may perform work upon an incoming part placed in the cell before the part is moved onward to a next cell to receive further processing. For example, a robot may perform work by operating an end effector in order to drill holes into the part, apply rivets to the part, etc.

While robots operate effectively and efficiently in manufacturing environments, a robot has a risk of unintentional collision with an object within the cell during normal operation. For example, computer models may suggest the robot will occupy certain predefined locations within the cell. However, if the robot and/or the part being worked on are not installed in the cell exactly at their expected positions and/or orientations, a collision may occur. Furthermore, a robot may be covered in dressing, which includes hydraulic hoses, power cabling, etc., and this dressing may not be sufficiently accounted for in the computer model for the cell. Thus, the dressing may unintentionally collide, snag, or catch on other objects within the cell.

To address these issues, it is not uncommon for a technician using a form of Coordinate Measurement Machine (CMM) to measure the position and/or orientation of various components within the cell, including the robot, the part, etc. However, these objects are measured in the coordinate system of the CMM, and the measurements of these objects include residual errors. Thus, in order to determine the distance between any point of an end effector of the robot and a part, it may be necessary to convert these measurements (which include errors) from the CMM coordinate system to the coordinate system for the robot. Thus, depending on the magnitude of the CMM measurement errors, collisions may still occur. Also, these measurements require dedicated equipment and time to process and periodically certify.

SUMMARY

Embodiments described herein operate an imaging system attached to a robot in order to scan an image of the robot through a mirror and quantify a volume occupied by the robot. This enables an accurate and quick determination of the volume occupied by the robot in a manufacturing cell, including for example any dressing attached to the robot. Furthermore, since the location of the imaging system is known and fixed with respect to the end effector of the robot, errors inherent in the imaging system measurements share a common path with the end effector machining tools, so they will cancel out. In contrast, errors inherent in an outside coordinate system would transfer to the robot coordinate system as errors for the end effector and robot pose.

One embodiment is an apparatus that includes a robot. The robot includes an end effector that operates within a manufacturing cell, and actuators defining a kinematic chain that reorients the end effector within the manufacturing cell. The robot also includes an imaging system mounted with the end effector, and a controller configured to identify a position and orientation of a mirror. The controller is able to direct the actuators to orient the imaging system towards the mirror, to acquire a point cloud of 3D positions by operating the imaging system to scan an image in the mirror, and to revise the 3D positions in the point cloud by folding the 3D positions about a surface defined by the mirror. The robot is also able to determine a volume occupied by the robot within the manufacturing cell based on the revised positions, and to direct the robot to operate based on the volume to prevent collisions within the manufacturing cell.

Another embodiment is a method of scanning a robot. The method includes operating an imaging system attached to an end effector of a robot to identify a position and orientation of a mirror within a manufacturing cell, directing actuators of the robot to orient the imaging system towards the mirror, acquiring a point cloud of 3D positions by operating the imaging system to scan an image in the mirror, and revising the 3D positions in the point cloud by folding the 3D positions about a surface defined by the mirror. The method also includes determining a volume occupied by the robot within the manufacturing cell based on the revised 3D positions, and directing the robot to operate based on the volume to prevent collisions within the manufacturing cell.

Another embodiment is a non-transitory computer readable medium embodying programmed instructions which, when executed by a processor, are operable for performing a method. The method includes operating an imaging system attached to an end effector of a robot to identify a position and orientation of a mirror within a manufacturing cell, directing actuators of the robot to orient the imaging system towards the mirror, acquiring a point cloud of 3D positions by operating the imaging system to scan an image in the mirror, and revising the 3D positions in the point cloud by folding the 3D positions about a surface defined by the mirror. The method also includes determining a volume occupied by the robot within the manufacturing cell based on the revised 3D positions, and directing the robot to operate based on the volume to prevent collisions within the manufacturing cell.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
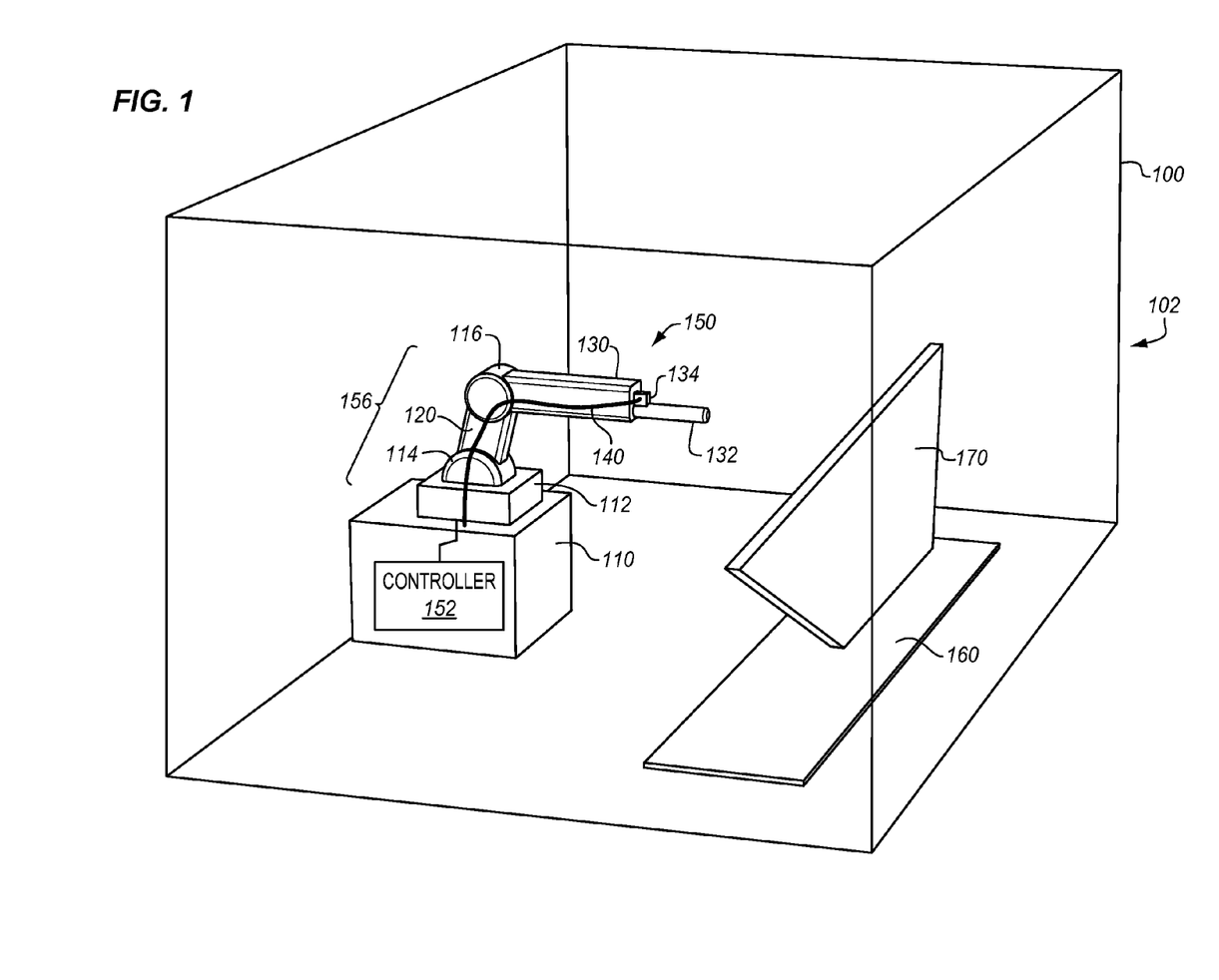
FIG. 1 is a diagram of a manufacturing cell in an exemplary embodiment.

FIG. 1 is a block diagram of a manufacturing cell 100 in an exemplary embodiment. Manufacturing cell 100 comprises any volume of space in which robot 150 is expected to operate to facilitate manufacturing, fabrication, and/or assembly of incoming parts. For example, manufacturing cell 100 may comprise an enclosed space, or an open volume of space on a factory floor. According to FIG. 1, manufacturing cell 100 includes volume 102, base 110, robot 150 mounted to base 110, conveyor 160, and part 170. Base 110 may comprise a structural component occupying a fixed location within manufacturing cell 100, or may comprise a mobile feature (e.g., a cart) capable of being driven across the factory floor in order to arrange robots and/or tooling into various configurations as desired. Thus, in some embodiments base 110, part 170, and conveyor 160 are mobile and/or drivable across the factory floor. Robot 150 is mounted to base 110, and includes multiple actuators (112, 114, 116) and rigid bodies (120, 130) which together define a kinematic chain 156. Robot 150 also includes end effector 132, which is capable of performing work upon part 170. For example, end effector 132 may comprise a saw, drill, rivet gun, Automated Fiber Placement (AFP) machine, etc.

Controller 152 directs the operations of robot 150, including end effector 132 and imaging system 134. Controller 152 may be implemented, for example, as custom circuitry, as a processor executing programmed instructions, or some combination thereof.

Part 170 may comprise any suitable structure configured to be worked upon by end effector 132. For example, part 170 may comprise a cured composite panel for an aircraft wing, a structural component of a fuselage, a strut, etc. Conveyor 160 moves part 170 into manufacturing cell 100, and may comprise an automated conveyor belt, a cart, etc.

In order to prevent end effector 132 from colliding with other objects in manufacturing cell 100, imaging system 134 is mounted with end effector 132 (e.g., mounted to end effector 134, or mounted to rigid body 130). Imaging system 134 scans space surrounding end effector 134 in order to generate 3D point clouds and prevent collisions. Furthermore, imaging system 134 is capable of utilizing a mirror (FIG. 2, 200) to accurately determine the volume occupied by robot 150, including any dressing 140 (e.g., power cabling, hydraulic hoses, etc.) attached to robot 150. In this manner, when robot 150 is moved via joint space instructions sent to actuators 112, 114, and 116, it is moved with an understanding of how that movement could result in collisions with other objects within manufacturing cell 100. Controller 152 may calculate volume information based upon input from imaging system 134, and may utilize this information when directing actuators 112, 114, and 116 in order to avoid collisions. Imaging system 134 may comprise a Light Detection and Ranging (LIDAR) system, a 3D scanner, or a 2D camera whose input (when considered with a nominal 3D model of robot 150) is utilized to calculate 3D positions, or any other suitable imaging system.

Figure 2:
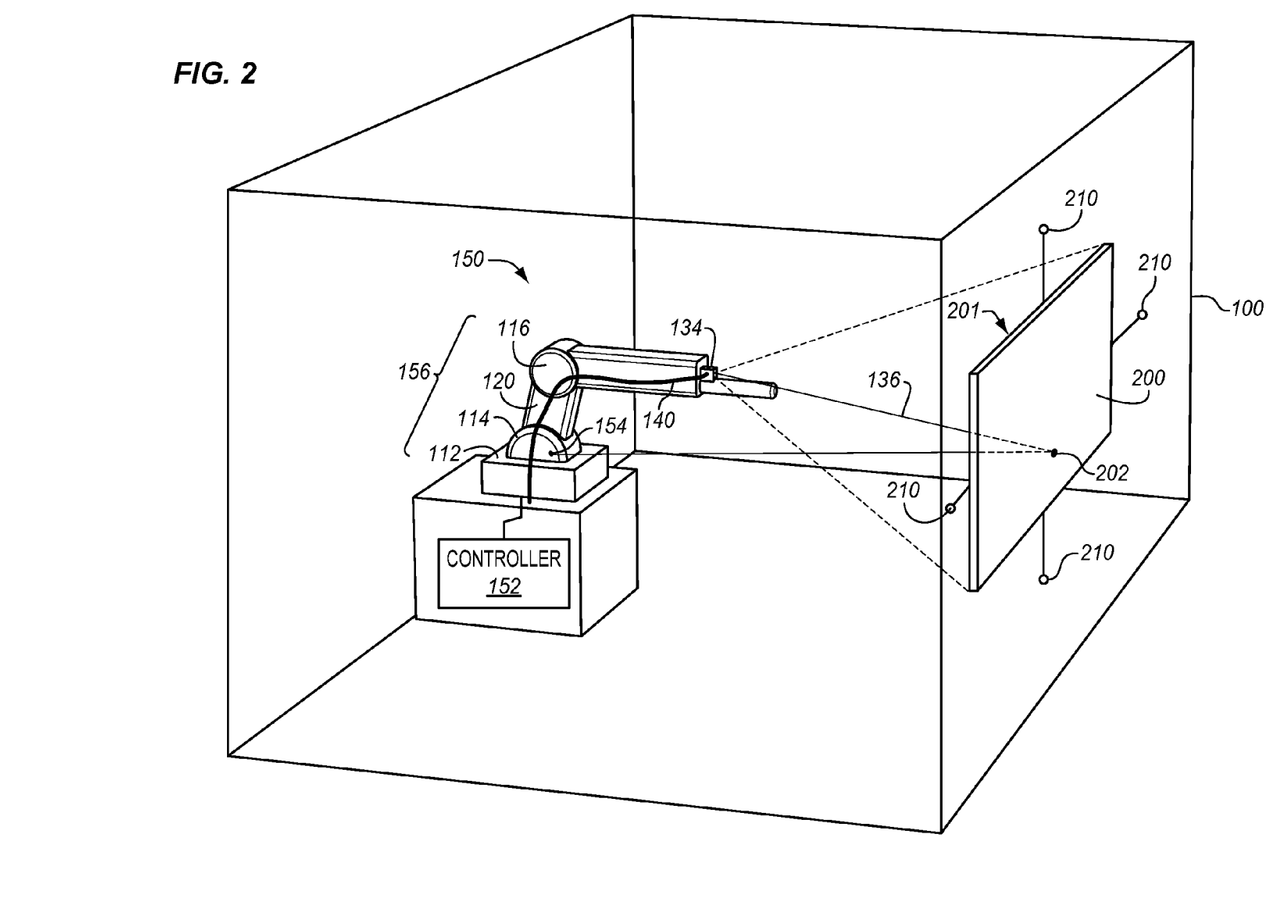
FIG. 2 is a diagram of a robot initializing in a manufacturing cell in an exemplary embodiment.

FIG. 2 is a diagram of robot 150 initializing in manufacturing cell 100 in an exemplary embodiment. In this embodiment, mirror 200 has been placed within manufacturing cell 100 in order to enable robot 150 to accurately determine its own volume. If desired, mirror 200 may be removed after initialization of robot 150 has completed. Mirror 200 includes surface 201, and may be accompanied by scanning targets 210, which are placed at known distances and directions from mirror 200 (e.g., along a border of mirror 200, one inch above, below, and/or to the sides of mirror 200, etc.). Targets 210 may be characterized by unique color and/or shape which are recognizable to controller 152. This may help to facilitate measuring the location and/or orientation of mirror 200 with respect to imaging system 134.

Illustrative details of the operation of robot 150 will be discussed with regard to FIG. 3. In this embodiment, robot 150 has begun an initialization process and is ready to perform a self-scan. Robot 150 has not yet begun to actively perform work upon incoming parts (e.g., part 170). This initialization process may be performed, for example, when robot 150 is first installed, once per day, once per hour, etc.

Figure 3:
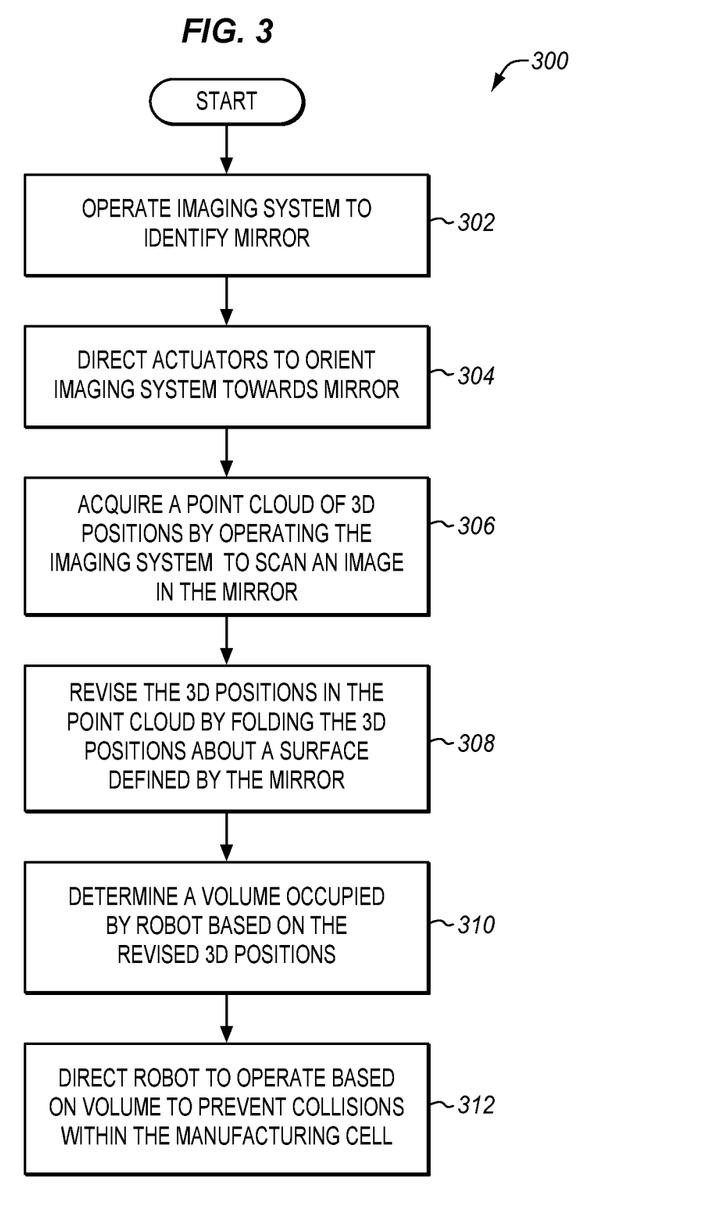
FIG. 3 is a flowchart illustrating a method for operating a robot in an exemplary embodiment.

FIG. 3 is a flowchart illustrating a method 300 for operating robot 150 in an exemplary embodiment. The steps of method 300 are described with reference to robot 150 as shown in FIGS. 1-2, but those skilled in the art will appreciate that method 300 may be performed in other systems as desired. The steps of the flowcharts described herein are not all inclusive and may include other steps not shown. The steps described herein may also be performed in an alternative order.

Controller 152 begins the initialization process by operating imaging system 134 to identify the location of mirror 200 within manufacturing cell 100 (step 302). As a part of this process, controller 152 may iteratively reposition/reorient imaging system 134 and acquire images until mirror 200 (or targets 210) is found (step 304). This process may therefore involve operating imaging system 134 to detect targets 210 proximate to mirror 200, and determining the position and orientation of mirror 200 with respect to imaging system 134 based on known locations of targets 210 with respect to mirror 200.

After robot 150 has oriented imaging system 134 towards mirror 200, controller 152 processes input from imaging system 134 to acquire a point cloud of 3D positions by operating imaging system 134 to scan an image presented at/reflected by mirror 200 (step 306). For example, in embodiments where imaging system 134 utilizes a laser, imaging system 134 may emit laser light 136 (as shown in FIG. 2) into mirror 200 at location 202. Light 136 is then reflected off of mirror 200 and onto location 154 on robot 150. The illumination of location 154 on robot 150 by laser light 136 appears as a position on the opposite side of mirror 200. The distance to the position is the same as the distance traveled via reflection off mirror 200 to robot 150. Thus, the total distance calculated by imaging system 134 for each position/point represents travel by laser light 136 from imaging system 134 to location 202, plus travel by laser light 136 from location/image 202 to location 154. Such techniques may be performed iteratively in order to acquire a 3D point cloud of locations occupied by robot 150 (e.g., including end effector 132) and dressing 140.

After distances have been measured via imaging system 134, controller 152 revises positions (e.g., 3D points) in the image by folding the positions about a known surface geometry of mirror 200, such as a known plane defining surface 201 of mirror 200 (step 308). Details of such processes are described below in the examples section.

Having revised the positions in the image by folding them about surface 201 of mirror 200, controller 152 may determine a volume occupied by robot 150 (e.g., including end effector 132, and/or dressing 140) based on the revised positions (step 310). The volume may be represented by a point cloud, as a series of voxels, etc. This information may then be stored in a memory of controller 152 in order to determine the volume occupied by robot 150. For example, robot 150 may be expected, based on a computer model, to occupy a certain volume when known forces are applied via actuators 112, 114, and 116. However, unexpected resisting forces (e.g., caused by kinks in dressing 140) may cause robot 150 to occupy a different volume than expected during operation.

Steps 302-310 may be performed iteratively by controller 152 as robot 150 is moved to each of multiple poses (e.g., different positions allowed by kinematic chain 156), in order to determine the volume actually occupied by robot 150 in each of those poses. Controller 152 may further store this volume information in memory on a pose by pose basis. For example, each volume may be correlated with a different combination of forces applied to actuators 112, 114, and 116 (each different combination of forces resulting in a different pose).

In further embodiments, the movements performed by robot 150 may have an impact on the pose arrived at by robot 150 when a combination of forces is applied to actuators 112, 114, and 116. For example, if robot 150 performs a circuitous motion before attempting to assume a pose, it may cause different forces/kinks to accrue in dressing 140 than if a different motion was used. This in turn may change the final pose assumed by robot 150 (and the volume occupied by robot 150), even though the same combination of forces is applied at the end of the motion by actuators 112, 114, and 116. In such circumstances, controller 152 first determines which different poses may occur when the same combination of forces is applied. Controller 152 further combines the volumes of robot 150 found in each of these different poses. Thus, when the combination of forces is applied, robot 150 will not collide with other objects (regardless of which of the different poses robot 150 is using).

After the volume of robot 150 has been determined (e.g., at each of multiple poses), controller 152 directs robot 150 to operate based on the volume (step 312). For example, if robot 150 is expected to have dressing 140 extend two centimeters beyond robot 150, but dressing 140 actually extends seven centimeters beyond robot 150, controller 152 may use this information to prevent collisions within manufacturing cell 100. As a part of this process, controller 152 may restrict robot 150 from assuming poses that would cause a collision with other objects detected within manufacturing cell 100.

In a further embodiment, controller 152 stores a Computer Aided Design (CAD) model of robot 150 within its memory. After determining the true volume of robot 150 in step 310, controller 152 identifies discrepancies between the CAD model and the true volume of robot 150 (e.g., locations where the true volume extends beyond the CAD model by more than one centimeter). Controller 152 may further generate and transmit a report indicating the position and severity of each of these discrepancies. For example, controller 152 may generate a file indicating the discrepancies, and transmit the file to a computer of a user. The file may include the location of each discrepancy, a linear measurement of the discrepancy, and a volumetric measurement of the discrepancy. As used herein, a discrepancy may comprise any deviation of position, size, or orientation of robot 150 from expected values indicated in the CAD file. In one embodiment, discrepancies are only reported if they are larger than a threshold value (e.g., more than one centimeter of linear deviation). In further embodiments, the threshold value may be set very low (e.g., within a millimeter) to ensure that the robot may detect metal, shavings, and/or other debris that has landed on robot 150 while it is performing work with end effector 134.

Method 300 provides a substantial benefit over prior systems, because it enables a robot 150 to scan itself in order to identify its true shape while in each of multiple poses. This allows a controller 152 to preemptively identify motions that will result in collisions for robot 150, and to avoid those collisions before they happen. Since each collision could otherwise result in a halt in manufacturing (or expensive repairs to robot 150 and/or other objects within or nearby manufacturing cell 100), avoiding these collisions provides a substantial benefit.

EXAMPLES

Figure 4:
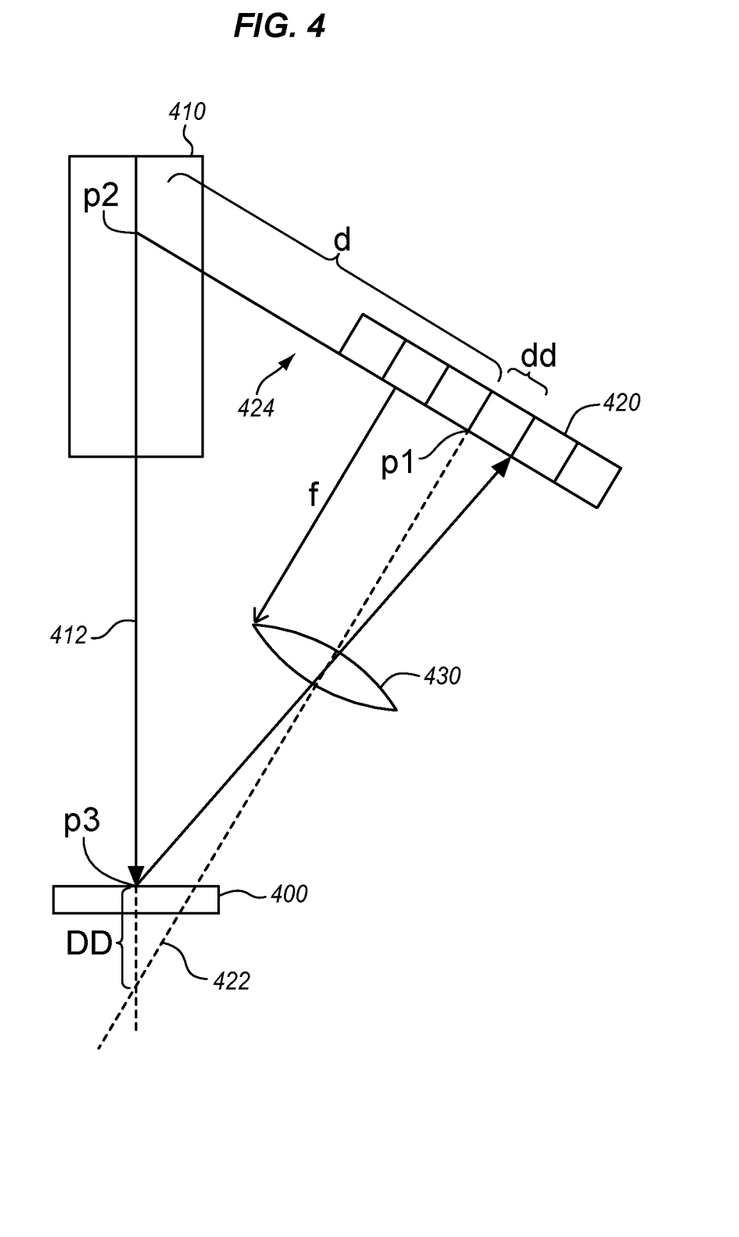
FIGS. 4-6 are diagrams illustrating folding of 3D positions in an exemplary embodiment.
Figure 5:
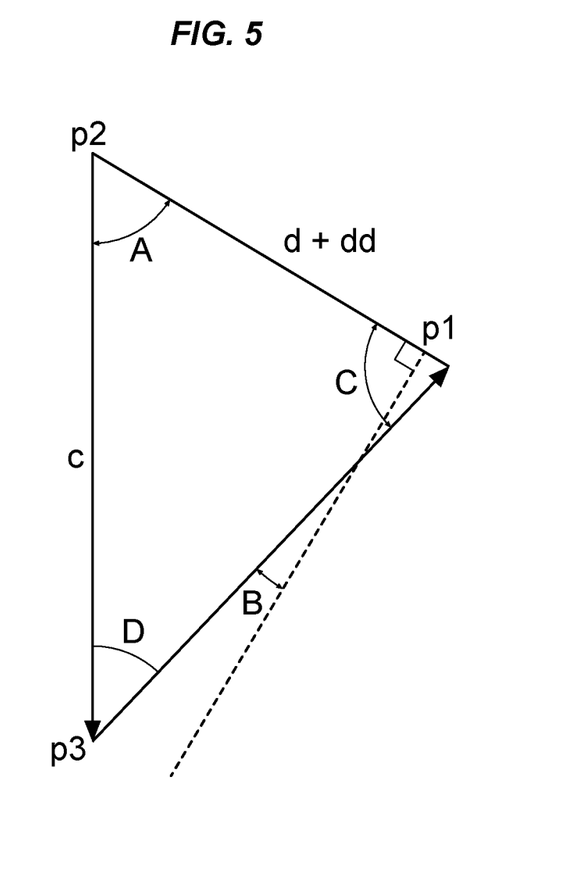
Figure 6:
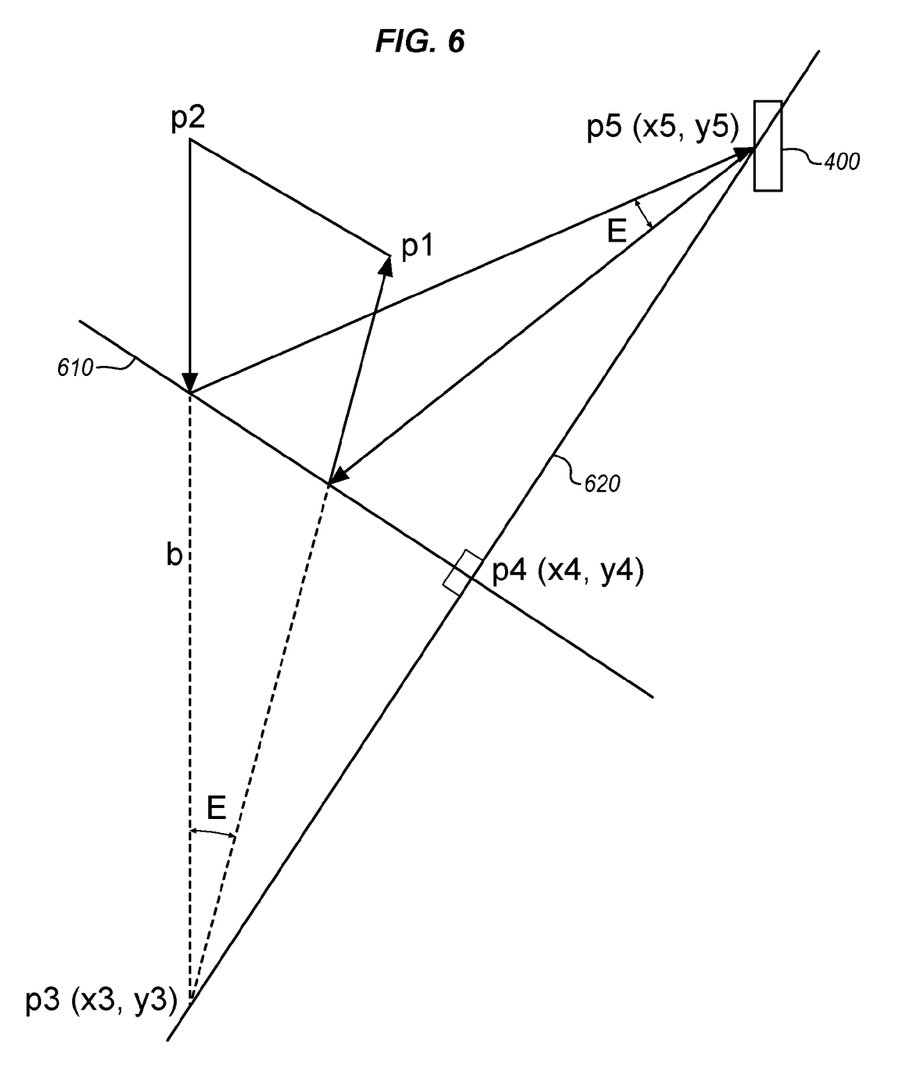

In the following examples, additional processes, systems, and methods are described in the context of a robot 150 that determines distances from an end effector 132 to other locations on robot 150. Specifically, in these examples FIGS. 4-6 are diagrams illustrating triangulation of distances for a robot 150 in an exemplary embodiment. These diagrams are discussed with regard to two dimensional geometries, but their principles are extensible to three dimensional geometric calculations, particularly when considered in light of the understanding that individual triangles are, by definition, planar. Furthermore, additional technologies and systems may be utilized for the purpose of performing a self-scan. These technologies include but are not limited to 3D scanner techniques, photogrammetric methods, Light Detection and Ranging (LIDAR), etc. For example, a photogrammetric method may use input from a 2D camera in combination with nominal 3D models to detect/acquire 3D positions by solving a resulting PnP problem for correlating 2D input to 3D positions. A solution to the PnP problem may return the translational and rotational offsets which transform from a nominal 3D model of a rigid body to 2D measurements using a best fit. In such circumstances, it may be beneficial to assume that the robot being scanned is a rigid body.

The following example focuses upon 3D scanner technologies, but similar ranging principles may be utilized with LIDAR and other technologies. According to FIG. 4, laser 410 emits a laser beam 412 from point p2 to point p3 on an object 400 being imaged from an imager centered at point p1. A delta distance between p1 and p2 (d) is known, and a delta distance (dd) is measured by determining where irradiance created by laser beam 412 spot (p3) strikes sensor 420. Furthermore, sensor 420 has a known line of sight and position (p1), and laser 410 has a known direction and position of (p2). Furthermore, as shown in FIG. 4, lens 430 is located a focal distance (f) away from sensor 420. Distance DD represents the distance between object 400 and lines of sight 422 of sensor 420. Focal plane 424 is also shown. Using trigonometric techniques, the distance between object 400 and sensor 420 may be determined. In short form, when beam 412 returns, a 2D centroid location on sensor 420 may be determined, and a distance traveled by beam 412 may be calculated based on the location of this centroid at sensor 420.

As shown in FIG. 5, triangulation may be used to identify various parameters pertaining to distance. Based on these parameters, a precise distance may be determined. Angle B may be defined as the inverse tangent of (dd/f), angle C may be defined as π/2−B, and angle D may be defined as πC−A−C. Using the law of sines, it will be understood that sine(D), divided by the sum of d and dd, equals sine(C) divided by distance c. Hence, by re-arranging this equation, it may be found that distance c equals the sum of d and dd, multiplied by sine(C) and divided by sine(D). Point p3 is located distance c from p2 along the direction of laser beam 412. Thus, distance to an object may be determined based on the re-arranged equation discussed above.

A mirror enables scanning to occur behind focal plane 424 (e.g., so long as the laser spot p3 remains within the sensor 420 depth of field and field of view). In such an embodiment, object 400 is viewed through a mirror defined by mirror line 610. As shown in FIG. 6, any linear mirror line 610 may be defined by the relationship $y=M_{mirror}*x+b_{mirror}$, while any linear reflection line 620 may be defined by the perpendicular line relationship $y=M_{reflect}*x+b_{reflect}$. In such an environment, p3 represents an image behind the mirror line 610 of illuminated position p5. Thus, calculations made with respect to position p3 are calculations that "fold" other position p5 perpendicularly about mirror line 610 (in 3D environments, the surface of the mirror may be defined as a plane). At position p3 having coordinate ($x_3$, $y_3$), $M_{reflect}=-1/M_{mirror}$, $y_3=M_{reflect}*x_3+b_{reflect}$, and $b_{reflect}=y_3-M_{reflect}*x_3$. At position p4 having coordinate ($x_4$, $y_4$) where the mirror line and reflection line intersect, $M_{mirror}*x_4+b_{mirror}=M_{reflect}*x_4+b_{reflect}$, $x_4*(M_{mirror}-M_{reflect})=b_{reflect}-b_{mirror}$, and $x_4=(b_{reflect}-b_{mirror})/(M_{mirror}-M_{reflect})$, and $y_4=M_{mirror}*x_4+b_{mirror}$. At position p5 having coordinate ($x_5$, $y_5$), $x_5=2*(x_4-x_3)$, and $y_5=(y_4-y_3)$. In a further embodiment, another mirror may be placed between p4 and p5 to provide visibility of a back side of sensor 420. When considered together, these equations provide a framework for measuring the true distance from an end effector to other points on a robot.

Figure 7:
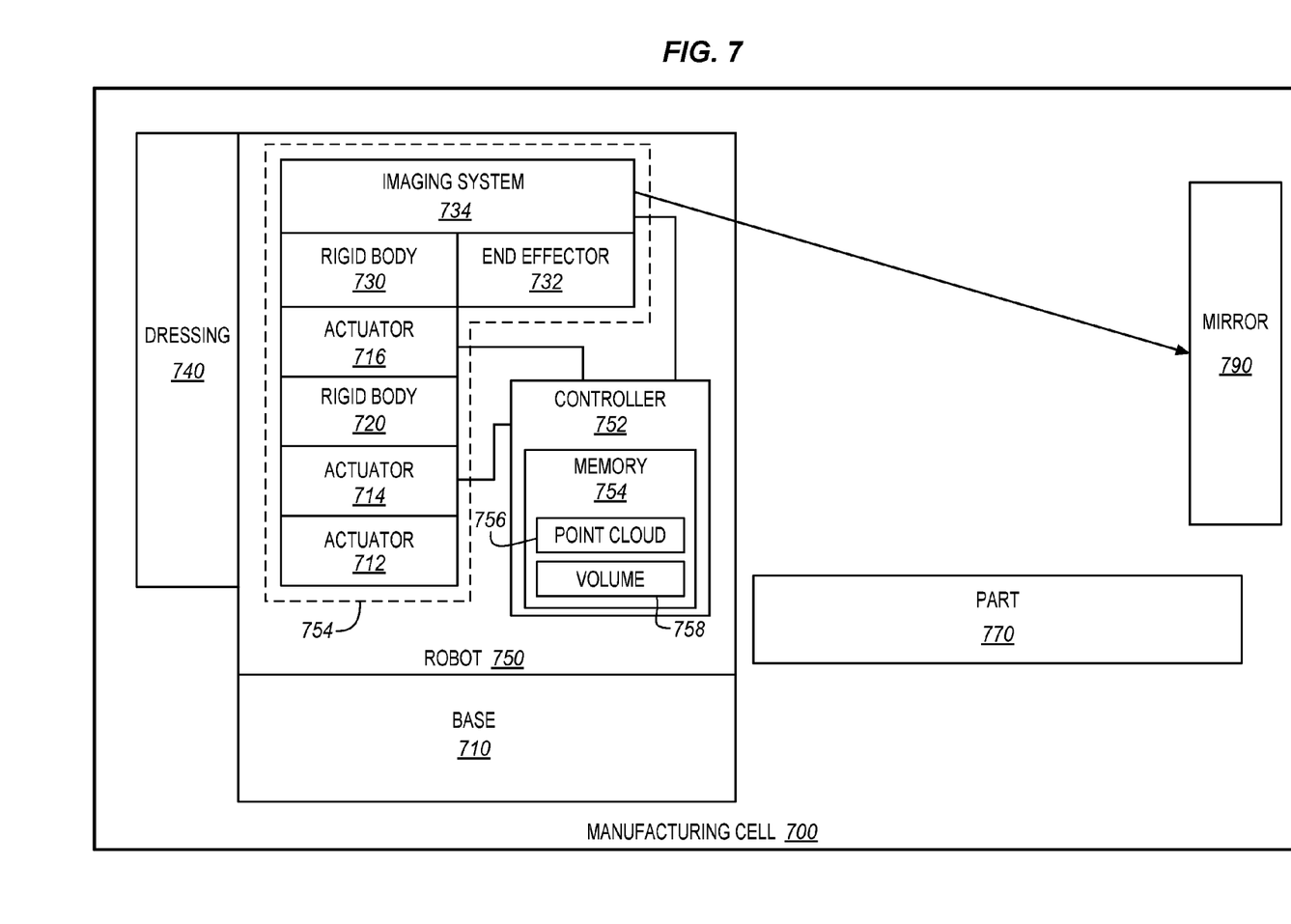
FIG. 7 is a block diagram of manufacturing cell in an exemplary embodiment.

FIG. 7 is a block diagram of manufacturing cell 700 in an exemplary embodiment. As shown in FIG. 7, cell 700 includes robot 750. Robot dressing 740 covers robot 750 to provide hydraulics and power to end effector 832. Robot 750 is attached to base 710, and includes controller 752. Controller 752 directs the operations of actuators 712, 714, and 716 in order to reposition rigid bodies 720 and 730. This also repositions end effector 732 (e.g., in order to perform work on part 770) and imaging system 734 (e.g., in order to scan robot 150). The combination of actuators 714, 716, and rigid bodies 720 and 730 (including imaging system 734 and end effector 732) form kinematic chain 754. Mirror 790 is also depicted. Controller 752 also includes memory 754. As controller 752 detects 3D positions based on input from imaging system 734, it stores these positions in point cloud 756, based on which volume 758 may be calculated and stored. Volume 758 may include all of robot 150, dressing 140, end effector 132, and/or imaging system 134. Furthermore, the specific volumes of each of these features of robot 150 may be identified/determined as a part/portion of volume 758. Utilizing robot 750 to scan itself provides a benefit over prior systems, because the volumes occupied by robot 150 while in different poses can be precisely measured, and correlated with the position of end effector 732. In this manner, end effector 732 may be repositioned without causing unexpected collisions.

Figure 8:
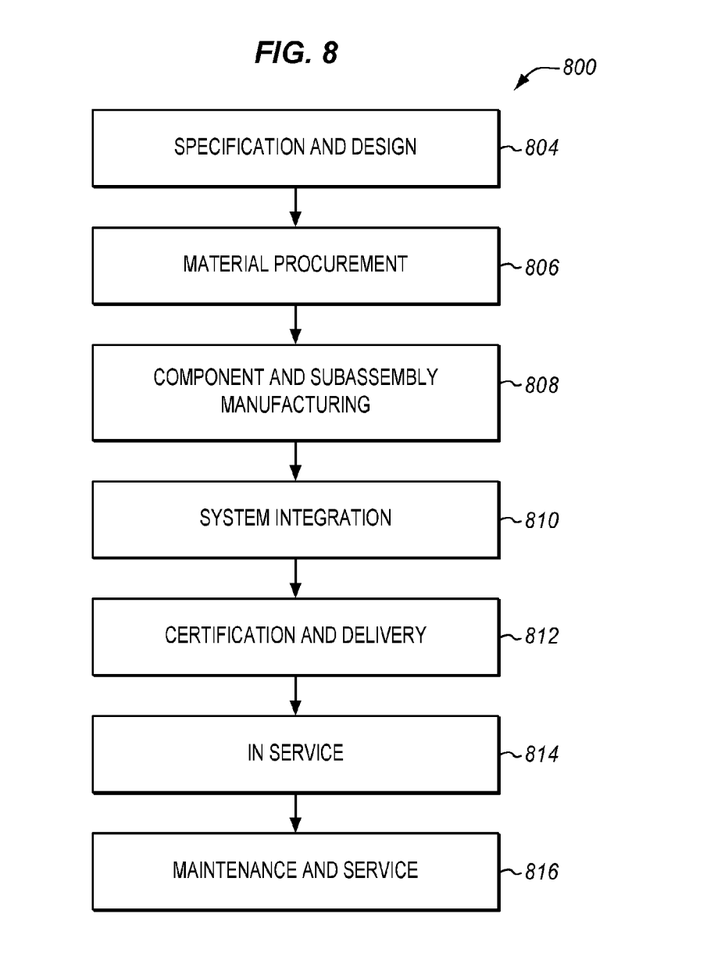
FIG. 8 is a flow diagram of aircraft production and service methodology in an exemplary embodiment.
Figure 9:
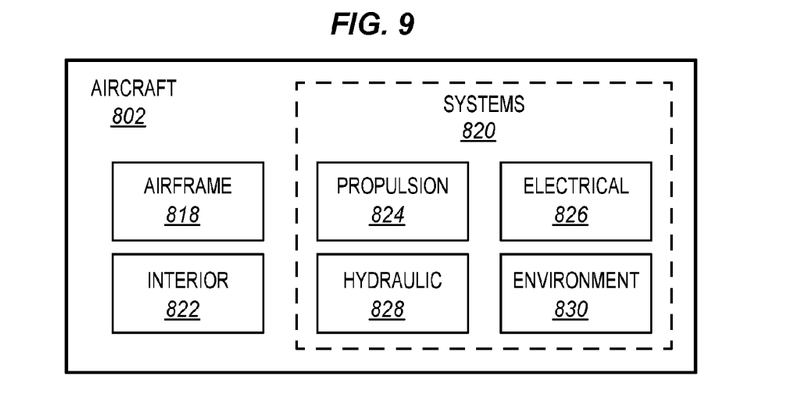
FIG. 9 is a block diagram of an aircraft in an exemplary embodiment.

Referring more particularly to the drawings, embodiments of the disclosure may be described in the context of an aircraft manufacturing and service method 800 as shown in FIG. 8 and an aircraft 802 as shown in FIG. 9. During pre-production, exemplary method 800 may include specification and design 804 of the aircraft 802 and material procurement 806. During production, component and sub-assembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by exemplary method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production stage 808 may be fabricated or manufactured in a manner similar to components or subassemblies produced while the aircraft 802 is in service. Also, one or more apparatus embodiments, method embodiments, or a combination thereof may be utilized during the production stages 808 and 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816. For example, the techniques and systems described herein may be used for steps 806, 808, 810, 814, and/or 816, and/or may be used for airframe 818, interior 822, and/or systems 820 (e.g., propulsion 824, electrical 826, hydraulic 828, and/or environmental 830).

In one embodiment, robot 150 manufactures a part 170 comprising a portion of airframe 118 during component and subassembly manufacturing 908. Part 170 may then be assembled into an aircraft in system integration 810, and then be utilized in service 814 until wear renders part 170 unusable. Then, in maintenance and service 816, robot 150 refurbishes part 170 or manufactures a new part 170.

Any of the various control elements shown in the figures or described herein may be implemented as hardware, software, firmware, or some combination of these. For example, an element may be implemented as dedicated hardware. Dedicated hardware elements may be referred to as "processors", "controllers", or some similar terminology.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
   a robot comprising:
   an end effector that operates within a manufacturing cell;
   actuators defining a kinematic chain that reorients the end effector within the manufacturing cell;
   an imaging system with the end effector; and
   a controller that identifies a position and orientation of a mirror, directs the actuators to orient the imaging system towards the mirror, acquires a point cloud of 3D positions by operating the imaging system to scan an image in the mirror, revises the 3D positions in the point cloud by folding the 3D positions about a surface defined by the mirror, determines a true volume occupied by the robot within the manufacturing cell based on the revised 3D positions, and directs the robot to operate based on the volume to prevent collisions within the manufacturing cell,
   the controller identifies discrepancies between the true volume and a volume defined by a Computer-Aided Design (CAD) model of the robot, wherein the discrepancies comprise differences in size between the true volume and the volume defined by the CAD model.

2. The apparatus of claim 1 wherein:
the true volume includes space occupied by dressing for the robot, the imaging system, and an end effector of the robot.

3. The apparatus of claim 1 wherein:
the controller determines a volume occupied by a dressing covering the robot within the manufacturing cell based on the revised positions.

4. The apparatus of claim 3 wherein:
the controller directs the robot to operate based on the volume occupied by the dressing to prevent collisions within the manufacturing cell.

5. The apparatus of claim 1 wherein:
the controller operates the imaging system to detect targets proximate to the mirror, and determines the position and orientation of the mirror with respect to the imaging system based on known locations of the targets with respect to the mirror.

6. The apparatus of claim 1 wherein:
the controller determines a volume occupied by the end effector based on the revised positions.

7. The apparatus of claim 1 wherein:
the end effector modifies a part within the manufacturing cell.

8. A method comprising:
operating an imaging system attached to an end effector of a robot to identify a position and orientation of a mirror within a manufacturing cell;
directing actuators of the robot to orient the imaging system towards the mirror;
acquiring a point cloud of 3D positions by operating the imaging system to scan an image in the mirror;
revising the 3D positions in the point cloud by folding the 3D positions about a surface defined by the mirror;
determining a volume occupied by the robot within the manufacturing cell based on the revised 3D positions;
directing the robot to operate based on the volume to prevent collisions within the manufacturing cell; and
identifying discrepancies between the true volume and a volume defined by a Computer-Aided Design (CAD) model of the robot, wherein the discrepancies comprise differences in size between the true volume and the volume defined by the CAD model.

9. The method of claim 8 wherein:
the true volume includes space occupied by dressing for the robot, the imaging system, and an end effector of the robot.

10. The method of claim 8 further comprising:
identifying a volume occupied by a dressing covering the robot within the manufacturing cell based on the revised positions.

11. The method of claim 10 further comprising:
directing the robot to operate based on the volume occupied by the dressing to prevent collisions within the manufacturing cell.

12. The method of claim 8 further comprising:
operating the imaging system to detect targets proximate to the mirror; and
determining the position and orientation of the mirror with respect to the imaging system based on known locations of the targets with respect to the mirror.

13. The method of claim 8 further comprising:
identifying a volume occupied by the end effector based on the revised positions.

14. The method of claim 8 further comprising:
operating the end effector to modify a part within the manufacturing cell.

15. A non-transitory computer readable medium embodying programmed instructions which, when executed by a processor, are operable for performing a method comprising:
operating an imaging system attached to an end effector of a robot to identify a position and orientation of a mirror within a manufacturing cell;
directing actuators of the robot to orient the imaging system towards the mirror;
acquiring a point cloud of 3D positions by operating the imaging system to scan an image in the mirror;
revising the 3D positions in the point cloud by folding the 3D positions about a surface defined by the mirror;

determining a volume occupied by the robot within the manufacturing cell based on the revised 3D positions;

directing the robot to operate based on the volume to prevent collisions within the manufacturing cell; and identifying discrepancies between the true volume and a volume defined by a Computer-Aided Design (CAD) model of the robot, wherein the discrepancies comprise differences in size between the true volume and the volume defined by the CAD model.

16. The medium of claim 15 wherein:

the true volume includes space occupied by dressing for the robot, the imaging system, and an end effector of the robot.

17. The medium of claim 15 wherein the method further comprises:

identifying a volume occupied by a dressing covering the robot within the manufacturing cell based on the revised 3D positions.

18. The medium of claim 17 wherein the method further comprises:

directing the robot to operate based on the volume occupied by the dressing to prevent collisions within the manufacturing cell.

19. The medium of claim 15 wherein the method further comprises:

operating the imaging system to detect targets proximate to the mirror; and determining the position and orientation of the mirror with respect to the imaging system based on known locations of the targets with respect to the mirror.

20. The medium of claim 15 wherein the method further comprises:

identifying a volume occupied by the end effector based on the revised 3D positions.

* * * * *